United States Patent
Nihei et al.

(10) Patent No.: US 7,168,769 B2
(45) Date of Patent: Jan. 30, 2007

(54) VEHICULAR BRAKE SYSTEM AND METHOD OF CONTROLLING SAME BRAKE SYSTEM

(75) Inventors: Toshihisa Nihei, Mishima (JP); Masahiro Hara, Susono (JP); Masahiro Matsuura, Chiryu (JP); Akifumi Doura, Obu (JP)

(73) Assignees: Toyota Jidosha Kabushiki Kaisha, Toyota (JP); Advics Co., Ltd., Kariya (JP)

( * ) Notice: Subject to any disclaimer, the term of this patent is extended or adjusted under 35 U.S.C. 154(b) by 0 days.

(21) Appl. No.: 10/734,245

(22) Filed: Dec. 15, 2003

(65) Prior Publication Data

US 2004/0124701 A1  Jul. 1, 2004

(30) Foreign Application Priority Data

Dec. 27, 2002  (JP)  ............................... 2002-381319

(51) Int. Cl.
*B60T 8/24*  (2006.01)

(52) U.S. Cl. .................... 303/140; 303/146; 701/70

(58) Field of Classification Search ................ 303/140, 303/146, 148, 155; 701/9, 70–72; 180/197
See application file for complete search history.

(56) References Cited

U.S. PATENT DOCUMENTS

| 5,219,212 | A | | 6/1993 | Shimada et al. | |
|---|---|---|---|---|---|
| 5,351,779 | A | * | 10/1994 | Yamashita | .................. 180/197 |
| 5,505,532 | A | | 4/1996 | Tozu et al. | |
| 5,636,909 | A | * | 6/1997 | Hirao et al. | ................. 303/140 |
| 5,863,105 | A | | 1/1999 | Sano | |
| 6,226,587 | B1 | * | 5/2001 | Tachihata et al. | ............. 701/72 |
| 6,321,155 | B1 | | 11/2001 | Fischer | |
| 6,324,460 | B1 | | 11/2001 | Lehmer et al. | |
| 6,584,397 | B1 | * | 6/2003 | Tanaka et al. | ................. 701/70 |
| 2001/0003805 | A1 | * | 6/2001 | Koibuchi | ........................ 701/9 |
| 2002/0109402 | A1 | * | 8/2002 | Nakamura | .................. 303/146 |

FOREIGN PATENT DOCUMENTS

| DE | 19512766 A1 | 10/1996 |
|---|---|---|
| JP | A 2-283555 | 11/1990 |
| JP | A 4-185562 | 7/1992 |
| JP | A 6-087419 | 3/1994 |
| JP | A 8-310363 | 11/1996 |
| JP | A 10-006968 | 1/1998 |
| WO | WO 01/26943 A1 | 4/2001 |

* cited by examiner

*Primary Examiner*—Christopher P. Schwartz
(74) *Attorney, Agent, or Firm*—Oliff & Berridge, PLC

(57) ABSTRACT

The brake system of the invention, during the ABS control mode, corrects the target slip rate in accordance with the turning of the vehicle, and determines whether the vehicle is running on a poor surface road. If the vehicle is running on a poor surface road, the system sets a target slip rate that provides a greater longitudinal force than the aforementioned target slip rate.

14 Claims, 6 Drawing Sheets

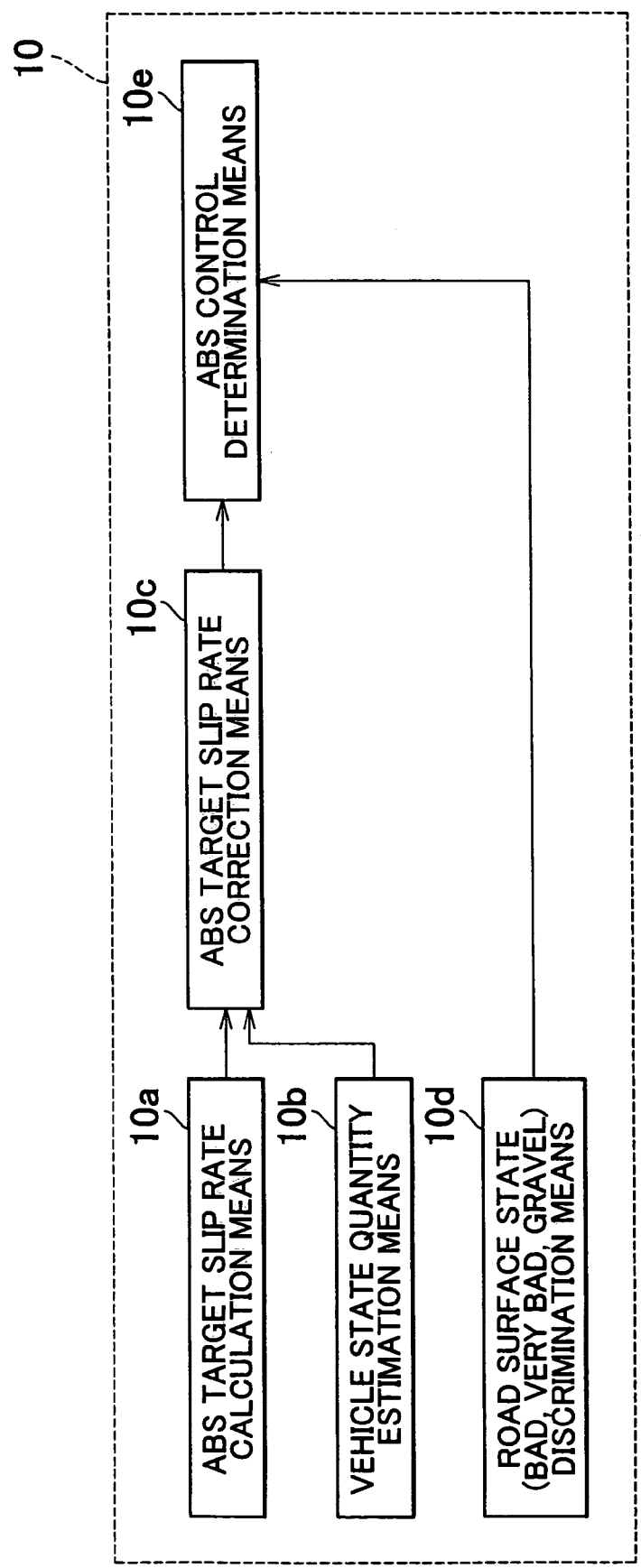

VEHICULAR BRAKE SYSTEM AND METHOD OF CONTROLLING SAME BRAKE SYSTEM

INCORPORATION BY REFERENCE

The disclosure of Japanese Patent Application No. 2002-381319 filed on Dec. 27, 2002, including the specification, drawings and abstract is incorporated herein by reference in its entirety.

BACKGROUND OF THE INVENTION

1. Field of the Invention

The invention relates to a brake system and a method of controlling the same brake system.

2. Description of the Related Art

An anti-skid (anti-lock) brake system (ABS) prevents a wheel from locking during hard braking and allows a steering operation during hard braking, and is a known as an active safety apparatus.

The following brake systems are known.

(1) A system in which an anti-lock control is changed in accordance with an index that indicates the momentum of a running vehicle (see Japanese Patent Application Laid-Open Publication No. 10-6968).

(2) A system in which a physical quantity that indicates the state of run of a vehicle is taken into account in determination of an ABS control strategy (see the specification of German Patent Application Laid-open Publication No. 19512766).

(3) A system in which the requested amount of control regarding an anti-lock control is set on the basis of the deviation of an actual yaw rate from a target yaw rate (Japanese Patent Application Laid-Open Publication No. 4-185562).

(4) A system in which a threshold of a target slip rate of an anti-lock control is controlled during an understeer/oversteer state of a vehicle (see Japanese Patent Application Laid-Open Publication No. 2-283555).

However, in the related-art brake systems, the braking force may sometimes decrease depending on the road surface condition during the ABS control.

SUMMARY OF THE INVENTION

The invention has been accomplished in view of the aforementioned circumstances. It is an object of the invention to provide a brake system capable of curbing reduction in braking force during an ABS control.

In order to achieve the aforementioned object, a brake system according to a first aspect of the invention includes a brake apparatus that applies braking force to each wheel of the vehicle and a controller that controls the braking force applied to the wheel by controlling the brake apparatus so that an actual slip rate of the wheel matches a target slip rate. With this brake system, during a specific brake control mode in which the target slip rate is set so as to prevent the actual slip rate of the wheel from exceeding a reference value and therefore avoid locking the wheel, the controller makes a first correction to the target slip rate set in the brake control mode such that the actual yaw rate of the vehicle matches a target yaw rate. Furthermore, if a reduction in braking force of the vehicle is expected, the controller ensures through an adjustment of the target slip rate, a provision of a greater longitudinal force on the wheel than that obtained with the target slip rate determined or would have been determined by the first correction.

According to the above-described brake system, during the specific brake control mode, the wheel is prevented from being locked and the steering operation during braking is allowed. Furthermore, the actual yaw rate of the vehicle is controlled to the target yaw rate, thereby stabilizing the vehicle behavior with respect to the yaw direction. If the braking force of the wheel is expected to reduce, the reduction in the braking force is curbed by ensuring through an adjustment of the target slip rate, a provision of a greater longitudinal force on the wheel than that obtained with the target slip rate determined or would have been determined by the first correction.

A second aspect of the invention relates to a method of controlling a brake apparatus for applying braking force to wheels of a vehicle. The method includes the steps of: controlling the braking force applied from the brake apparatus to each wheel when an actual slip rate of the wheel has exceeded a reference value, so that the actual slip rate matches a target slip rate and the wheel is thereby prevented from being locked; making a first correction to the target slip rate so that an actual yaw rate of the vehicle matches a target yaw rate; and ensuring through an adjustment of the target slip rate, a provision of a greater longitudinal force on the wheel than that obtained with the target slip rate determined or would have been determined by the first correction if a reduction in braking force of the vehicle is expected.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein:

FIG. 4 is a block diagram indicating functions of an ECU 10.

DETAILED DESCRIPTION OF THE PREFERRED EMBODIMENTS

Figure 1:
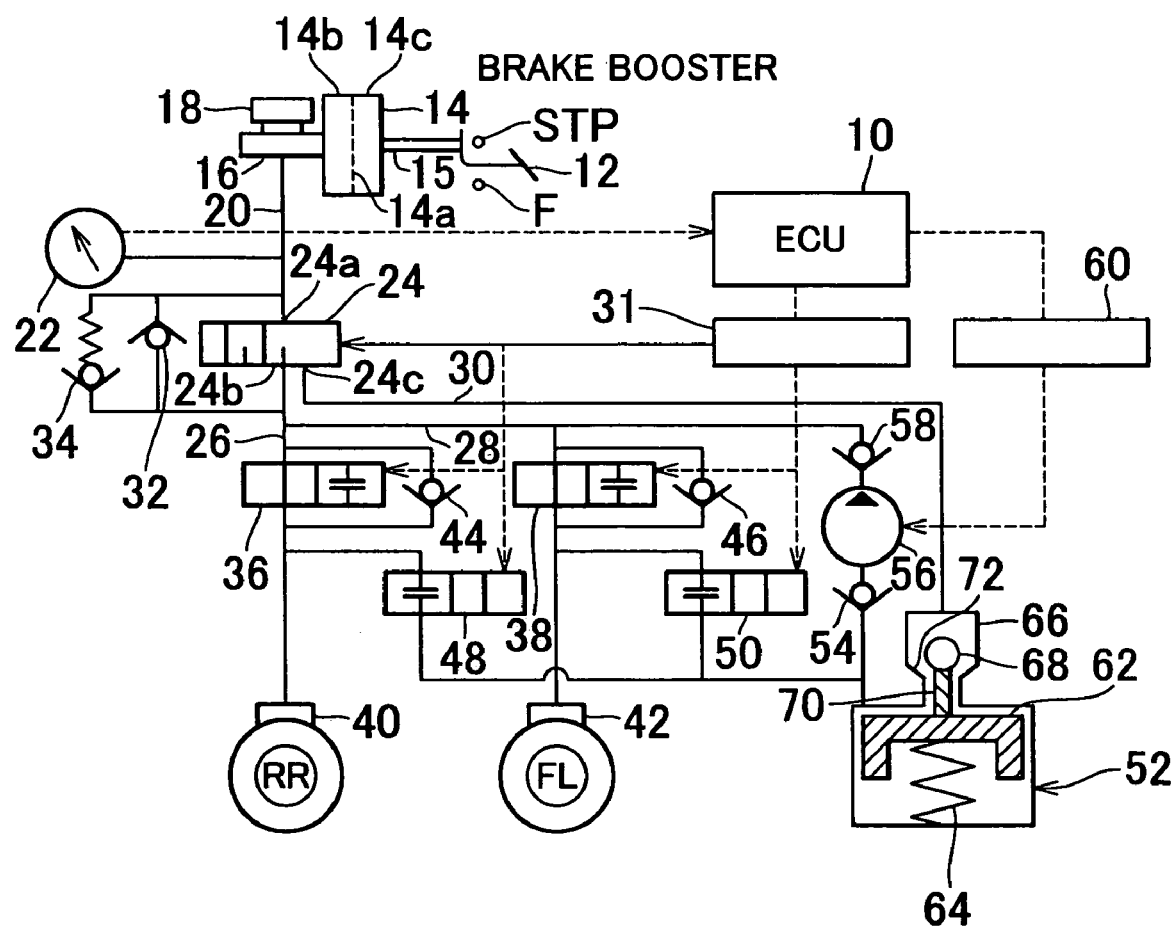
FIG. 1 is a diagram illustrating a system construction of a braking force control apparatus.

Preferred embodiments of the invention will be described hereinafter with reference to the accompanying drawings. Like components and portions are represented by like reference numerals, and will not be redundantly described below. FIG. 1 is a diagram illustrating the construction of a brake system in accordance with one embodiment of the invention.

The brake system of the embodiment is a hydraulic brake apparatus, and is controlled by an electronic control unit (hereinafter, referred to as "ECU") 10. FIG. 1 shows component elements constituting brake mechanisms for a front left wheel FL and a rear right wheel RR. A brake hydraulic system will first be described.

A braking force control apparatus includes a brake pedal 12. The brake pedal 12 is connected to an actuation shaft 15 of a brake booster 14. A master cylinder 16 is fixed to the brake booster 14. In the brake booster 14 are a constant pressure chamber 14b and a variable pressure chamber 14c that are partially defined by a diaphragm 14a.

The constant pressure chamber 14b is always supplied with a negative pressure via an intake pipe of an engine. When the brake pedal 12 is slightly depressed, a stop lamp switch STP turns on. As the brake pedal 12 is further depressed, a depression force switch F for determining whether the depression force is equal to or greater than a reference value (set load) turns on.

In the embodiment, the negative pressure in the constant pressure chamber 14b is termed booster negative pressure. The variable pressure chamber 14c is supplied with the negative pressure from the constant pressure chamber 14b when the brake pedal 12 is not depressed. When the brake pedal 12 is depressed, a pressure from the atmosphere regulated in accordance with the pedal depressing force is introduced into the variable pressure chamber 14c. Therefore, a differential pressure corresponding to the pedal depressing force occurs between the variable pressure chamber 14c and the constant pressure chamber 14b. Due to the differential pressure, an assist force with a predetermined boost ratio with respect to the pedal depressing force is generated.

A master cylinder pressure $P_{M/C}$ of brake fluid corresponding to the resultant force of the pedal depressing force and the assist force occurs in a fluid pressure chamber provided in the master cylinder 16. Thus, the brake booster 14 has a mechanism for assisting the brake operation through the use of the booster negative pressure as a power source and generating a great master cylinder pressure $P_{M/C}$.

A reservoir tank 18 is disposed over an upper portion of the master cylinder 16. A predetermined amount of brake fluid is held in the reservoir tank 18. If depression of the brake pedal is discontinued, the fluid pressure chamber of the master cylinder 16 becomes connected in communication with the reservoir tank 18. A fluid pressure passageway 20 is connected to the fluid pressure chamber of the master cylinder 16.

An oil pressure sensor 22 is connected in communication to the fluid pressure passageway 20. An output signal of the oil pressure sensor 22 is supplied to the ECU 10. The ECU 10 detects the master cylinder pressure $P_{M/C}$ on the basis of the output signal of the oil pressure sensor 22.

An electromagnetic three-way valve 24 is connected to the fluid pressure passageway 20. The electromagnetic three-way valve 24 is a two-position three-way electromagnetic valve having a first port 24a, a second port 24b and a third port 24c. The first port 24a is connected in communication with the fluid pressure passageway 20. The second port 24b is connected in communication with fluid pressure passageways 26, 28. The third port 24c is connected in communication with a fluid pressure passageway 30.

During an off-state of the electromagnetic three-way valve 24, the first port 24a and the second port 24b are connected in communication, and the third port 24c is closed. During an on-state, that is, during a state where the electromagnetic three-way valve 24 is supplied with a driving signal from the ECU 10 via a solenoid relay 31, the first port 24a and the third port 24c are connected in communication, and the second port 24b is closed. FIG. 1 indicates the on-state of the electromagnetic three-way valve 24.

A check valve 32 and a relief valve 34 are disposed in parallel to the electromagnetic three-way valve 24 between the fluid pressure passageway 20 and the fluid pressure passageway 26. The check valve 32 is a one-way valve that allows fluid to flow only in the direction from the side of the fluid pressure passageway 20 to the side of the fluid pressure passageway 26. The relief valve 34 is a valve mechanism that opens only when the fluid pressure on the side of the fluid pressure passageway 26 becomes higher than the fluid pressure on the side of the fluid pressure passageway 20 by a predetermined value.

Holding solenoids 36, 38 are connected in communication to the fluid pressure passageways 26, 28. Each of the holding solenoids 36, 38 is a two-position electromagnetic valve that normally assumes an open state, and that assumes a closed state upon supply of a driving signal from the ECU 10 via the solenoid relay 31. The holding solenoids 36, 38 are connected in communication to a wheel cylinder 40 of the rear right wheel RR and a wheel cylinder 42 of the front left wheel FL, respectively. The holding solenoids 36, 38 are provided with check valves 44, 40, respectively, that are disposed in parallel to the holding solenoids. The check valves 44, 40 are one-way valves that allow fluid to flow only in the direction from the side of the wheel cylinders 40, 42 to the side of the fluid pressure passageways 26, 28.

Pressure reducing solenoids 48, 50 are connected in communication to the wheel cylinders 40, 42, respectively. The pressure reducing solenoids 48, 50 are two-position electromagnetic valves that normally assume a closed state, and that assume an open state when supplied with a driving signal from the ECU 10 via the solenoid relay 31. The pressure reducing solenoids 48, 50 are both connected in communication to an auxiliary reservoir 52.

The auxiliary reservoir 52 is connected in communication to a suction side of a pump 56 via a check valve 54. The check valve 54 is a one-way valve that allows fluid to flow only in the direction from the side of the auxiliary reservoir 52 to the side of the pump 56. An ejection side of the pump 56 is connected in communication to the fluid pressure passageway 28 via a check valve 58. The check valve 58 is a one-way valve that allows fluid to flow only in the direction from the side of the pump 56 to the side of the fluid pressure passageway 28. Upon receiving a driving signal from the ECU 10 via a pump relay 60, the pump 56 is actuated to deliver the brake fluid pumped from the auxiliary reservoir 52 to the fluid pressure passageways 26, 28.

A piston 62 and a spring 64 are disposed within the auxiliary reservoir 52. The piston 62 is urged by the spring 64 in such a direction as to reduce the capacity of the auxiliary reservoir 52. Therefore, a predetermined fluid pressure is generated in the brake fluid held in the auxiliary reservoir 52. The auxiliary reservoir 52 is provided with a reservoir port 66 that communicates with the fluid pressure passageway 30. A ball valve 68 and a thrust shaft 70 are disposed within the reservoir port 66.

The reservoir port 66 is provided with a seat portion 72 that functions as a valve seat for the ball valve 68. Two ends of the thrust shaft 70 are in contact with the piston 62 and the ball valve 68, respectively.

When brake fluid is not flowing into the auxiliary reservoir 52, the piston 62 stays at an uppermost end position in FIG. 1 (hereinafter, referred to as "home position"). In the auxiliary reservoir 52, a fluid pressure passageway is provided which secures communication of the fluid pressure passageway 30 with the pressure reducing solenoids 48, 50 and the suction side of the check valve 54 when the piston 62 is at the home position.

When the piston 62 is at the home position, the ball valve 68 is apart from the seat portion 72. The clearance formed between the ball valve 68 and the seat portion 72 decreases with increases in the amount of brake fluid held in the auxiliary reservoir 52, that is, with increases in the displacement of the piston 62. The ball valve 68 becomes seated on the seat portion 72 at the time point when the amount of brake fluid held in the auxiliary reservoir 52 reaches a predetermined value.

When the ball valve 68 is seated on the seat portion 72, the inflow of brake fluid from the fluid pressure passageway 30 to the auxiliary reservoir 52 is blocked. Control modes of the brake will next be described.

The braking force control apparatus (fluid pressure control means) shown in FIG. 1 accomplishes a normal brake control of generating an amount of control corresponding to the amount of brake operation performed by a driver, and a brake assist control (hereinafter, referred to as "BA control") of generating an increased braking force that is greater than normal when an emergency brake operation is performed by a driver. That is, the braking force controls performed by the ECU 10 include (1) normal brake control, (2) BA control, and (3) ABS (anti-lock brake) control as follows.

(1) Normal Brake Control
(i) Electromagnetic three-way valve 24: off (connecting the master cylinder and the wheel cylinders in communication).
(ii) Holding solenoids 36, 38: opened.
(iii) Pump 56: stopped.

The normal brake control is effected when the electromagnetic three-way valve 24 is off, and the holding solenoids 36, 38 are opened, the pressure reducing solenoids 48, 50 are closed, and the pump 56 is stopped. Hereinafter, this state will be referred to as "normal brake state."

When the normal brake state is established, the master cylinder 16 and the wheel cylinders 40, 42 are placed in communication. In this case, the wheel cylinder pressure $P_{W/C}$ of the wheel cylinders 40, 42 is controlled to a fluid pressure equal to the master cylinder pressure $P_{M/C}$. During the normal brake state, therefore, the braking force acting on the vehicle is controlled to be of a magnitude corresponding to the brake pedal depressing force.

(2) BA Control
(i) Electromagnetic three-way valve 24: on (shutting off communication between the master cylinder and the wheel cylinders while securing a return path from the pump 56)
(ii) Holding solenoids 36, 38: opened
(iii) Pump 56: operated The BA control is effected when the electromagnetic three-way valve 24 is turned on, and the holding solenoids 36, 38 are opened, the pressure reducing solenoids 48, 50 are closed, the pump 56 is operated, after determining that the emergency brake operation has been performed. This state will be hereinafter referred to as "BA state."

When the electromagnetic three-way valve 24 is turned on, the master cylinder 16 and the auxiliary reservoir 52 becomes connected in communication. After the master cylinder 16 and the auxiliary reservoir 52 are thus placed in communication, the brake fluid flows from the master cylinder 16 into the auxiliary reservoir 52 until the ball valve 68 is seated on the seat portion 72.

The brake fluid in the auxiliary reservoir 52 is pumped up by the pump 56, and is delivered to the fluid pressure passageway 26. Therefore, after the BA control starts, high-pressure brake fluid is conducted into the fluid pressure passageways 26, 28 through the use of the pump 56 as a fluid pressure source.

During execution of the BA control, the high-pressure brake fluid conducted into the fluid pressure passageways 26, 28 is further conducted to the wheel cylinders 40, 42 via the holding solenoids 36, 38, respectively. Therefore, after the BA control begins, the wheel cylinder pressure $P_{W/C}$ quickly rises to a fluid pressure that is higher than the master cylinder pressure $P_{M/C}$. Thus, according to the BA control, the braking force can be quickly raised after an emergency brake operation has begun.

(3) ABS Control
(i) Electromagnetic three-way valve 24: off
(ii) Holding solenoids 36, 38: opened or closed so as not to lock a wheel Pressure reducing solenoids 48, 50: opened or closed so as not to lock a wheel
(iii) Pump 56: operated The ABS control is a control mode that is entered if an actual slip rate exceeds a threshold (reference value) during the BA control or other specific states of operation. The ABS control is effected by turning off the electromagnetic three-way valve 24, and operating the pump 56, and appropriately opening or closing the holding solenoids 36, 38 and the pressure reducing solenoids 48, 50, in addition to the normal brake control and the brake assist function.

In general, a driver depresses the brake pedal 12 quickly with a great depressing force when the driver requests a quick rise in the braking force. If such a brake operation is performed, the master cylinder pressure $P_{M/C}$ rises to a high pressure with a great gradient.

Therefore, it can be determined that an "emergency brake operation" has been performed, for example, if the master cylinder pressure $P_{M/C}$ becomes equal to or greater than a threshold $THP_{M/C}$ and the gradient of increase $dP_{M/C}/dt$ of the master cylinder pressure $P_{M/C}$ becomes equal to or greater than a threshold $THdP_{M/C}/dt$.

Prior to the description of what braking force control is performed during the ABS control, the ABS control will be described.

Figure 2:
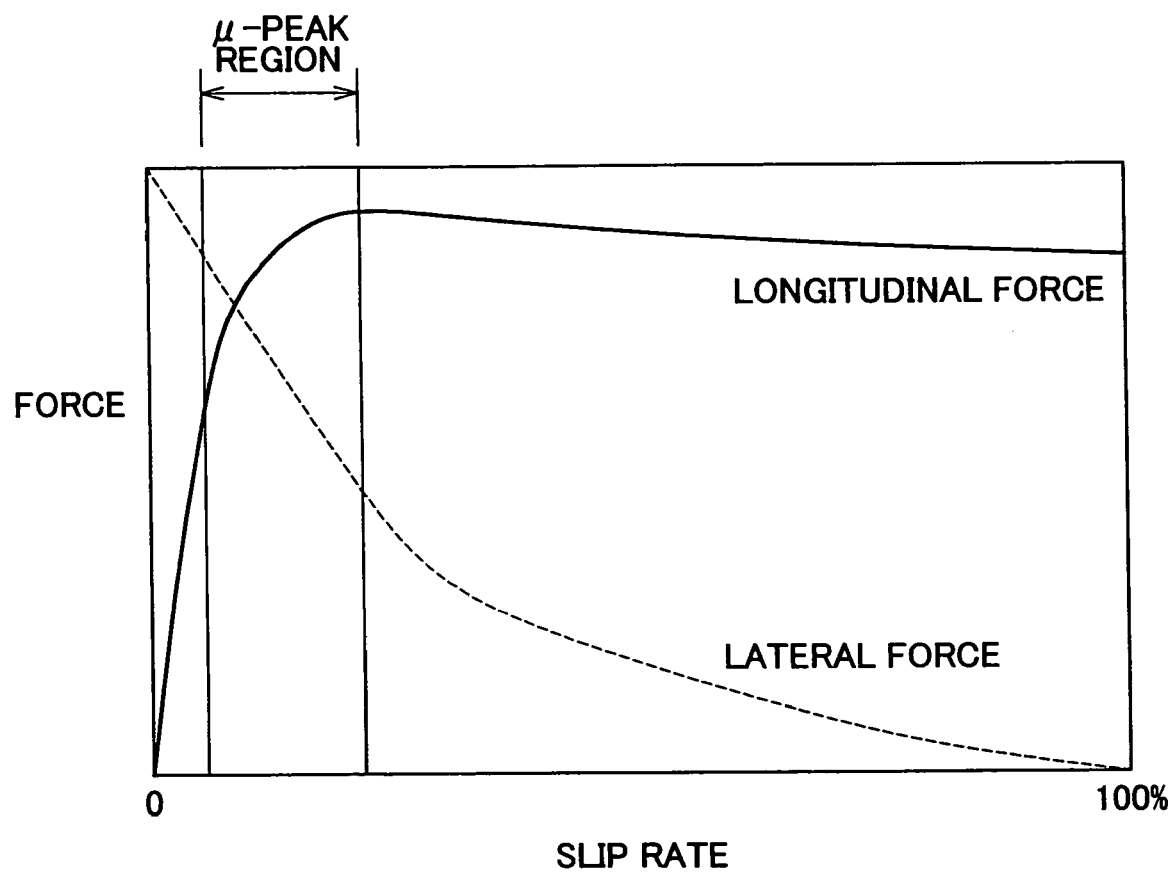
FIG. 2 is a graph indicating a relationship between the slip rate (%) of a tire wheel and the force (frictional force) occurring between the wheel and the road surface.

FIG. 2 is a graph indicating a relationship between the slip rate (%) of a wheel (tire) and the force (frictional force) occurring between the wheel and the road surface.

The slip rate of a wheel is the proportion of a difference between the vehicle body speed $V_B$ and the wheel speed $V_H$ to the vehicle body speed $V_B$. That is, the slip rate of a wheel is defined so that during a coasting of a vehicle without braking, the vehicle body speed and the rotation speed of a wheel are equal and therefore the slip rate is 0%, and so that the slip rate becomes 100% when the wheel is completely locked.

The vehicle body speed can be determined from a mean value of the rotation speeds of the rotating wheels, an integral value obtained from a longitudinal acceleration sensor, a rate of time-dependent change in the positional information acquired from the GPS, or an estimated value based on the aforementioned values.

The speeds of the wheels can be determined through the use of values output from the wheel speed sensors. That is, this vehicle is equipped with vehicle body speed detection means for determining the vehicle body speed, and wheel speed detection means for determining the rotation speeds of the wheels.

The braking force (fore-aft force, i.e., longitudinal force) that is generated on a wheel in the longitudinal direction (traveling direction) becomes maximum (i.e., substantially maximum) when the slip rate is between $S_{LL}$ and $S_{UL}$. The lower limit slip rate $S_{LL}$ is about 10%, and the upper limit slip rate $S_{UL}$ is about 20%. This region between the slip rates $S_{LL}$, $S_{UL}$ (will be termed "μ-peak region") is a target region of the slip rate where a maximum braking force can be achieved during the ABS control. If there occurs a great slip rate deviating from the target range, the longitudinal braking force can be increased by appropriately decreasing the fluid pressure so as to reduce the slip rate.

The braking force on a wheel in the lateral direction (lateral force) becomes maximum when the slip rate is 0%. The lateral force monotonously decreases with increases in the slip rate, and becomes substantially zero when the slip rate is 100%. In order to secure good braking force in the longitudinal and lateral directions and achieve both good vehicle controllability and good braking force characteristic, the μ-peak region is set as the range of slip rate of about 10% to about 20%. To achieve a slip rate within such a target region, the wheel cylinder internal fluid pressure is controlled as described below.

Figure 3:
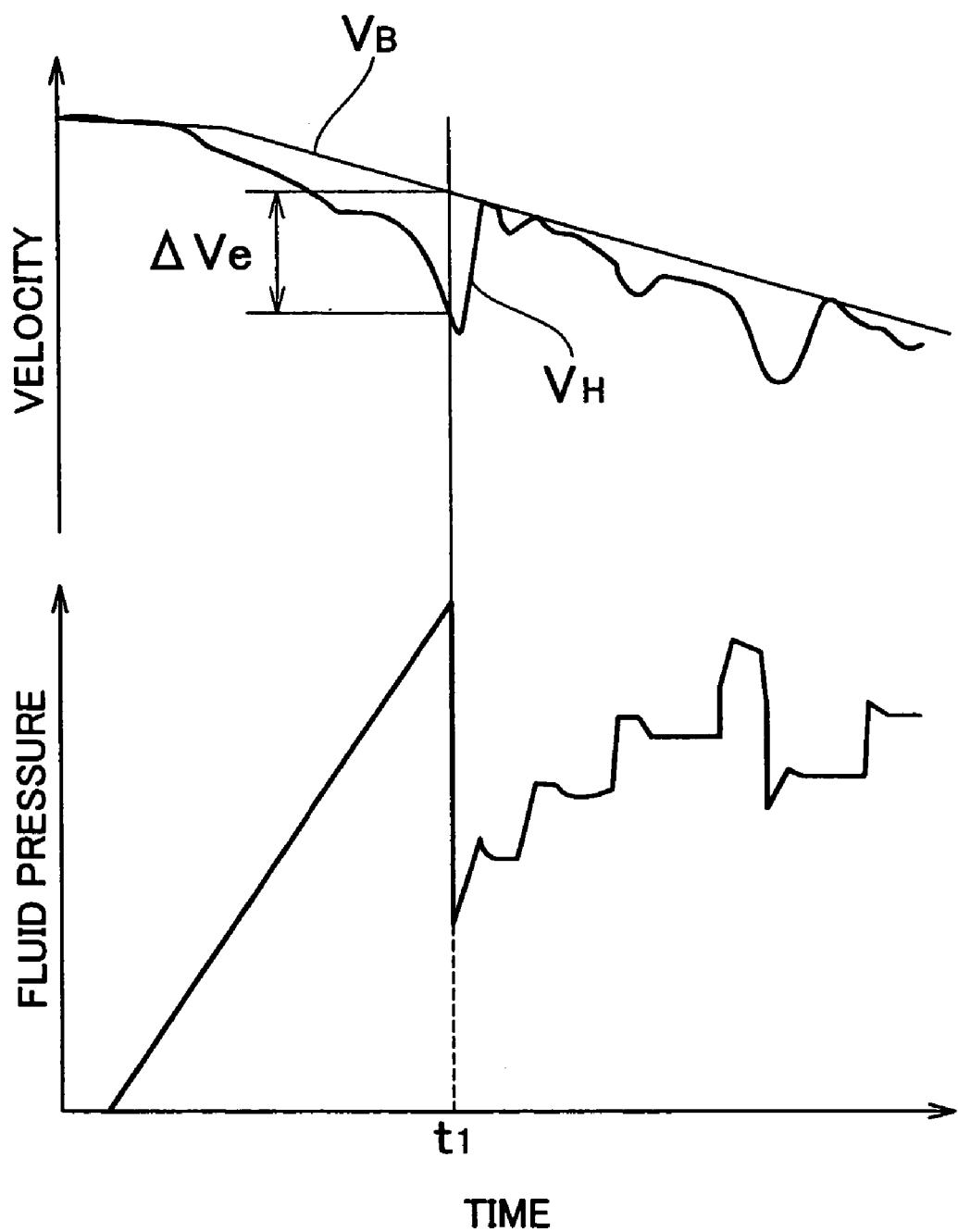
FIG. 3 is a graph indicating time dependencies of the vehicle body speed $V_B$, the wheel speed $V_H$ and the fluid pressure in a wheel cylinder.

FIG. 3 is a graph indicating time dependencies of the vehicle body speed $V_B$, the wheel speed $V_H$ and the fluid pressure in the wheel cylinder.

As stated above, the slip rate is dependent on the difference $\Delta Ve$ between the vehicle body speed $V_B$ and the wheel speed $V_H$ ($\Delta Ve=V_B-V_H$), and the wheel speed can be controlled by the fluid pressure in the wheel cylinder provided for actuating a brake device. That is, the slip rate can be controlled by the fluid pressure. The difference $\Delta Ve$, that is, the slip rate, tends to increase if the fluid pressure is increased, and tends to decrease if the fluid pressure is reduced. Thus, during the ABS control, the fluid pressure control is performed so that the slip rate can be kept within the μ-peak range. If the fluid pressure is controlled in three modes, that is, the increasing of the pressure, the holding of the pressure, and the decreasing of the pressure, the target slip rate can be increased if the time of pressure increase is longer or the time of holding pressure is longer or the period of pressure decrease is shorter.

This will be explained in detail. If the brake is applied by increasing the fluid pressure in the wheel cylinder, both the wheel speed and the vehicle body speed decrease. However, if the value of time quadrature, which is proportional to the integral of the fluid pressure, of the wheel cylinder fluid pressure becomes excessively great, the slip rate, that is, the difference $\Delta Ve$ between the wheel speed and the vehicle body speed, becomes greater than the threshold. Therefore, in such a case, the ABS operation is started in order to reduce the fluid pressure in the wheel cylinder (t1). When the wheel speed recovers, the fluid pressure in the wheel cylinder is increased again. In this manner, the control is repeated so that the slip rate remains between 10% and 20%. While the actual slip rate is detected, the fluid pressure is controlled so that the actual slip rate becomes equal to the target slip rate.

For example, if the actual slip rate determined from the vehicle body speed and the wheel speed is X % (X is excessively great) and the target slip rate is set at 15%, the difference $\Delta Ve$ can be made smaller so that the actual slip rate matches the target slip rate by reducing the time quadrature PI (fluid pressure) of the fluid pressure per unit time in proportion to the deviation of the actual slip rate (X−15)%. Likewise, if the actual slip rate is Y % (Y is excessively small) and the target slip rate set at 15%, the difference $\Delta Ve$ can be made larger so that the actual slip rate matches the target slip rate by increasing the time quadrature PI (fluid pressure) of the fluid pressure per unit time in proportion to the deviation of the actual slip rate (15−Y)%.

In short, during the ABS control, the actual slip rate becomes equal to the target slip rate if the value of time quadrature PI of the fluid pressure is adjusted in proportion to the aforementioned deviation.

In order to increase the time quadrature PI of the fluid pressure, the following methods may be employed.

As described above in (3) ABS CONTROL, while the pump 56 is actuated and the pressure reducing solenoids 48, 50 are closed, the holding solenoids 36, 38 are opened for an open valve period T1 and are closed for a holding period T2 so that the fluid pressure in the wheel cylinders 40, 42 is increased. During one control cycle, the time quadrature PI of the fluid pressure increases if the proportion of the holding period T2 increases.

The ECU 10 changes the pattern of increasing/decreasing the fluid pressure in the wheel cylinders 40, 42 in order to change the actual slip rate to the target slip rate. In this case, if the fluid pressure increase/decrease pattern is changed so that the integral value of the fluid pressure per unit time increases, the actual slip rate increases. If the actual slip rate is smaller than the μ-peak region, the longitudinal braking force decreases and the lateral braking force increases.

This will be explained in detail. In order to increase the actual slip rate to the target slip rate, the ECU 10 increases the frequency of holding the fluid pressure after the actual slip rate has reached the predetermined target slip rate, so that the integral value of the fluid pressure per unit time increases and therefore the actual slip rate increases. In this case, the electromagnetic three-way valve 24 can be turned on, and the fluid pressure in the wheel cylinders 40, 42 can be increased over the fluid pressure in the master cylinder. Thus, the time quadrature PI of the fluid pressure increases.

If the target slip rate is increased, the ECU 10 increases the fluid pressure in the wheel cylinders 40, 42 over the fluid pressure in the master cylinder 16. In this case, since the pressure in the wheel cylinders 40, 42 is set high, a braking force quickly acts on the wheels RR, FL. Thus, a high-speed variation control of the braking force becomes possible. As described above in (3) ABS CONTROL, while the pump 56 is actuated, the holding solenoids 36, 38 are opened for the open valve period T1 and are closed for the holding period T2 so that the fluid pressure in the wheel cylinders 40, 42 is increased. Furthermore, the pressure reducing solenoids 48, 50 are opened for a pressure reducing period T3. During one control cycle, the time quadrature PI of the fluid pressure increases if the proportion of the pressure reducing period T3 decreases. In this case, too, the electromagnetic three-way valve 24 may be turned on. That is, in this example, the pressure reduction sensitivity is reduced so that the pressure reduction less readily occurs.

That is, while changing the increase/decrease pattern of the fluid pressure, the ECU 10 curbs the reduction in the fluid pressure in the wheel cylinders, in order to increase the actual slip rate. In this case, by curbing the reduction in the fluid pressure in the wheel cylinders 40, 42, the integral value of the fluid pressure per unit time is increased, so that the actual slip rate becomes greater.

As described above, the time quadrature PI of the fluid pressure for achieving the target slip rate can be increased by (i) increase of the holding period, or (ii) decrease of the pressure reduction period, or (iii) pressure increase using a pump.

If the time quadrature PI of the fluid pressure increases, the wheel speed decreases, and therefore the actual slip rate increases. The ECU 10 calculates a target slip rate needed for stabilizing the vehicle behavior, and determines the present actual slip rate. Then, using the above-described method, the ECU 10 increases or reduces the time quadrature PI of the fluid pressure so that the deviation of the actual slip rate from the target slip rate decreases.

In short, if a target slip rate is determined, a control procedure for achieving the target slip rate is specified.

FIG. 4 is a block diagram illustrating the functional configuration of the ECU 10.

The ECU 10 has ABS target slip rate calculation means 10a for calculating a target slip rate $S_{INITIAL}$ during the ABS control mode, vehicle state quantity estimation means 10b for estimating the state quantity of the vehicle, such as the vehicle speed or the like, ABS target slip rate correction means 10c for correcting the target slip rate $S_{INITIAL}$ so as to achieve a target yaw rate determined from the vehicle speed and the angle of steering wheel (steering) if the vehicle speed determined by the vehicle state quantity estimation means 10b exceeds a predetermined value, road surface state discrimination means 10d for discriminating states of the road surface, and ABS control determination means 10e for setting the corrected target slip rate $S_{CORRECTED}$ provided by the ABS target slip rate correction means 10c as a final target slip rate $S_{FINAL}$ on the basis of the state of the road surface determined by the road surface state discrimination means 10d.

The functions of the ECU 10 will be described.

Figure 5A:
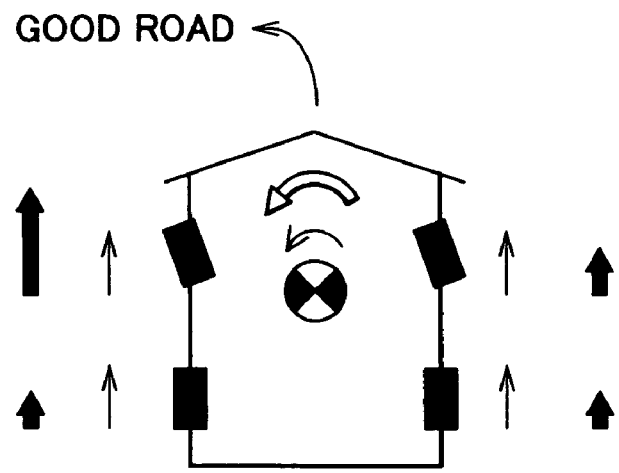
FIG. 5A is an illustration for explaining the target slip rate set for each wheel of a vehicle when the vehicle is running on a good road.
Figure 5B:
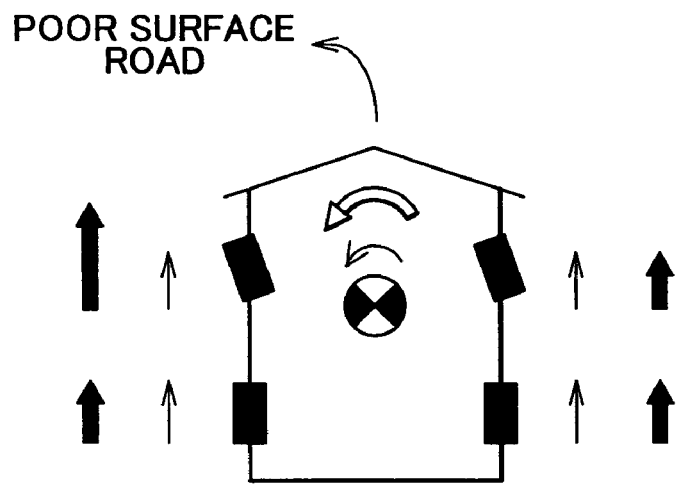
FIG. 5B is an illustration for explaining the target slip rate set for each wheel of the vehicle when the vehicle is running on a poor surface road.
Figure 5C:
FIG. 5C is an illustration for explaining the target slip rate set for each wheel of the vehicle when the vehicle is running on a very poor surface road.

FIG. 5A is an illustration for explaining the target slip rate set for each wheel of a vehicle when the vehicle is running on a good road. FIG. 5B is an illustration for explaining the target slip rate set for each wheel of the vehicle when the vehicle is running on a poor surface road. FIG. 5C is an illustration for explaining the target slip rate set for each wheel of the vehicle when the vehicle is running on a very poor surface road.

The ABS target slip rate calculation means 10a sets the target slip rate $S_{INITIAL}$ within the μ-peak region if the brake pedal is depressed (in FIGS. 5A to 5C, narrow-line arrows indicate the magnitudes of target slip rate set for the wheels). With the target slip rate thus set, normally, a maximum braking force can be achieved, and the traveling direction of the vehicle can be changed by operating the steering wheel.

The ABS target slip rate correction means 10c corrects the target slip rate $S_{INITIAL}$ so as to improve the cornering performance of the vehicle (in FIGS. 5A to 5C, wide arrows indicate the magnitudes of target slip rate set for the wheels). Now, it is assumed that the vehicle is understeering. In order to improve the cornering performance, the target slip rate of the outer wheel receiving great load during the turning of the vehicle and the target slip rate of the two rear wheels are decreased, and therefore the lateral force is increased ($S_{CORRECTED}$) (first correction). The target slip rate of the inner wheel during the turning is increased from an initial target slip rate $S_{INITIAL}$ in view of maintaining the balance of braking force as a whole.

What has been described above is a setting for running on a good road. If the state of road surface determined by the road surface state discrimination means 10d is a good road, the ABS control determination means 10e determines the target slip rate $S_{CORRECTED}$ as a final target slip rate $S_{FINAL}$.

However, if the road surface state determined by the road surface state discrimination means 10d is a poor surface road, the ABS control determination means 10e increases the target slip rate of each wheel from the rate set for a good road, and determines the increased target slip rate of each wheel as a final target slip rate $S_{FINAL}$ (second correction). Here, it is noted that "poor surface road" or "very poor surface road" represents a road, the surface of which is not in good condition or good conditions, such as a rough road, dirt road, gravel road (which are normally unpaved roads), wet road, snowy road, icy road. That is, in this above case, the lateral force on each wheel decreases, but the longitudinal force on each wheel is set within or near the μ-peak region, so that the braking force increases. Thus, when the vehicle is running in a difficult situation for barking such as when it runs on a poor surface road, the braking force of the vehicle is increased by setting the slip rate as described above.

If the road surface state determined by the road surface state discrimination means 10d is a very poor surface road (e.g., gravel road), the ABS control determination means 10e increases the target slip rate $S_{CORRECTED}$ set for a good road to a rate that is greater than the target slip rate for a poor surface road, and determines the increased target slip rate as a final target slip rate $S_{FINAL}$ (second correction). In this case, the lateral force on each wheel decreases, but the longitudinal force on each wheel is set within or near the μ-peak region, so that the braking force increases. Thus, when the vehicle is running in a very difficult situation for braking such as when it runs on a very poor surface road, the braking force if the vehicle is increased by setting the slip rate as aforementioned. Particularly on a gravel road, the target slip rate of each wheel is set above the μ-peak region so as to completely lock the wheels. In this manner, great braking force can be provided.

The determination regarding the road surface state is carried out on the basis of signals from the wheel speed sensors for detecting the rotation speeds of the corresponding wheels. That is, each wheel speed sensor outputs a sinusoidal or rectangular wave signal that is synchronous with the wheel rotation. Since each wheel vibrates depending on the road surface state, the signal from each wheel speed sensor contains frequency components corresponding to the road surface state. Therefore, sample data is collected through sampling with (i) a good road, (ii) a poor surface road, and (iii) a very poor surface road (gravel road), and specific frequency components obtained with the respective roads are pre-stored in a memory. The stored frequency components are then compared with the actual frequency components, and the road surface state defined by the stored frequency component that has high coincidence with the actual frequency component is determined as a road surface state present at the time of detection.

In order to extract a frequency component from the signal output from each wheel speed sensor, a fast Fourier transformer or the like is used. If the vehicle is equipped with a vertical acceleration sensor, the output of the vertical acceleration sensor may alternatively or additionally be used as a basis for the determination regarding the road surface state since the value output by the sensor varies in accordance with the road surface state.

Many techniques and technologies related to the above-described road surface state determination are known.

A method for calculating the target yaw rate will be described. The vehicle is equipped with a yaw rate sensor (not shown) that detects the actual yaw rate, the wheel speed sensors that output signals from which the speed of the vehicle is derived, and a steering-wheel angle sensor that detects the angle of the steering wheel which corresponds to the angle of tire wheels.

The target yaw rate can be set through the use of the vehicle speed and the angle of the steering wheel. The ECU 10 calculates the target yaw rate $Y_{TARGET}$ on the basis of the vehicle speed and the angle of the steering wheel detected via the wheel speed sensors and the steering-wheel angle sensor.

The ECU 10 corrects the target slip rates $S_{INITIAL}$ of the right and left wheels so that the actual yaw rate $Y_{REAL}$ output from the yaw rate sensor matches the calculated target yaw rate $Y_{TARGET}$. That is, if the determined target yaw rate $Y_{TARGET}$ is of a value indicating that the vehicle is turning, the target slip rate $S_{INITIAL}$ of the ABS mode is corrected so as to improve the cornering performance of the vehicle. Since the wheel lateral force decreases as the slip rate decreases, reduction of the slip rate improves the cornering performance of the vehicle so that the actual yaw rate $Y_{REAL}$ during the turning of the vehicle approaches the target yaw rate $Y_{TARGET}$.

That is, for the ABS control, the target slip rate $S_{INITIAL}$ is normally set within the range of slip rate in which the frictional force becomes maximum, that is, within the μ-peak region in this embodiment. However, if the target slip rate thus set is effected as it is, a sufficient lateral force can not be obtained, namely the cornering performance of the vehicle cannot be improved during the understeer state. To counter this, when the vehicle is turning, the lateral force is increased so as to improve the cornering performance of the vehicle by reducing the target slip rate $S_{INITIAL}$ while detecting the actual yaw rate $Y_{REAL}$. In this fashion, the actual yaw rate $Y_{REAL}$ is brought closer to the target yaw rate $Y_{TARGET}$. If the angle of the steering wheel and the vehicle speed are determined, the turning radius can be determined. If the centrifugal force occurring with this specific radius determined is calculated, the target yaw rate $Y_{TARGET}$ can be determined.

That is, if the target yaw rate $Y_{TARGET}$ is determined, the target slip rate can be determined. However, the target slip rate $S_{INITIAL}$ determined by the ECU 10 is dependent on the value of time quadrature of the fluid pressure applied into the wheel cylinders. Namely, the actual yaw rate can be controlled by controlling the value of time quadrature of the fluid pressure As described above, the first correction performed by the ECU 10 reduces the target slip rate $S_{INITIAL}$ of a wheel located on the outer side relative to the target slip rate of the wheel located on the other side if the actual yaw rate $Y_{REAL}$ is smaller than the target yaw rate $Y_{TARGET}$. The target slip rate $S_{INITIAL}$ of another wheel located on the same outer side is set below the μ-peak region, so that the lateral force thereof is made greater than the lateral force obtained during the ABS control mode.

By reducing the target slip rate of the outer wheel receiving load during a turn, that is, by increasing the lateral force on the same wheel, the cornering performance of the vehicle improves whereby the actual yaw rate $Y_{REAL}$ approaches the target yaw rate $Y_{TARGET}$.

The target slip rate $S_{CORRECTED}$ obtained through the first correction is increased if the vehicle is running on a poor surface road or a very poor surface road (second correction), and the thus-corrected slip rate is set as a final target slip rate $S_{FINAL}$. In this case, the target slip rate $S_{CORRECTED}$ once set smaller than the μ-peak region is increased, so that the longitudinal force on each wheel increases and therefore the braking force increases.

The foregoing description has been given in conjunction with the case where the actual yaw rate is smaller than the target yaw rate, that is, where the detected running state of the vehicle is such that the vehicle is understeering. In contrast, if the detected running state of the vehicle is such that the vehicle is oversteering, reduction of the lateral force is appropriate; therefore, the target slip rate $S_{INITIAL}$ initially set during the ABS control mode is corrected to an increased target slip rate $S_{CORRECTED}$, if necessary, in order to reduce the cornering performance. In this case, the lateral force decreases. Hence, if of prime importance is the braking force, the target slip rate is reduced or the aforementioned correction is prohibited (or cancelled) so that the target slip rate is set within the μ-peak region, and is effected as a final target slip rate $S_{FINAL}$. That is, the final target slip rate $S_{FINAL}$ is set at a target slip rate that provides a greater longitudinal force than achieved with the target slip rate obtained in the first correction.

In general, FF vehicles tend to understeer, while FR vehicles and MR vehicles tend to oversteer.

Figure 6:
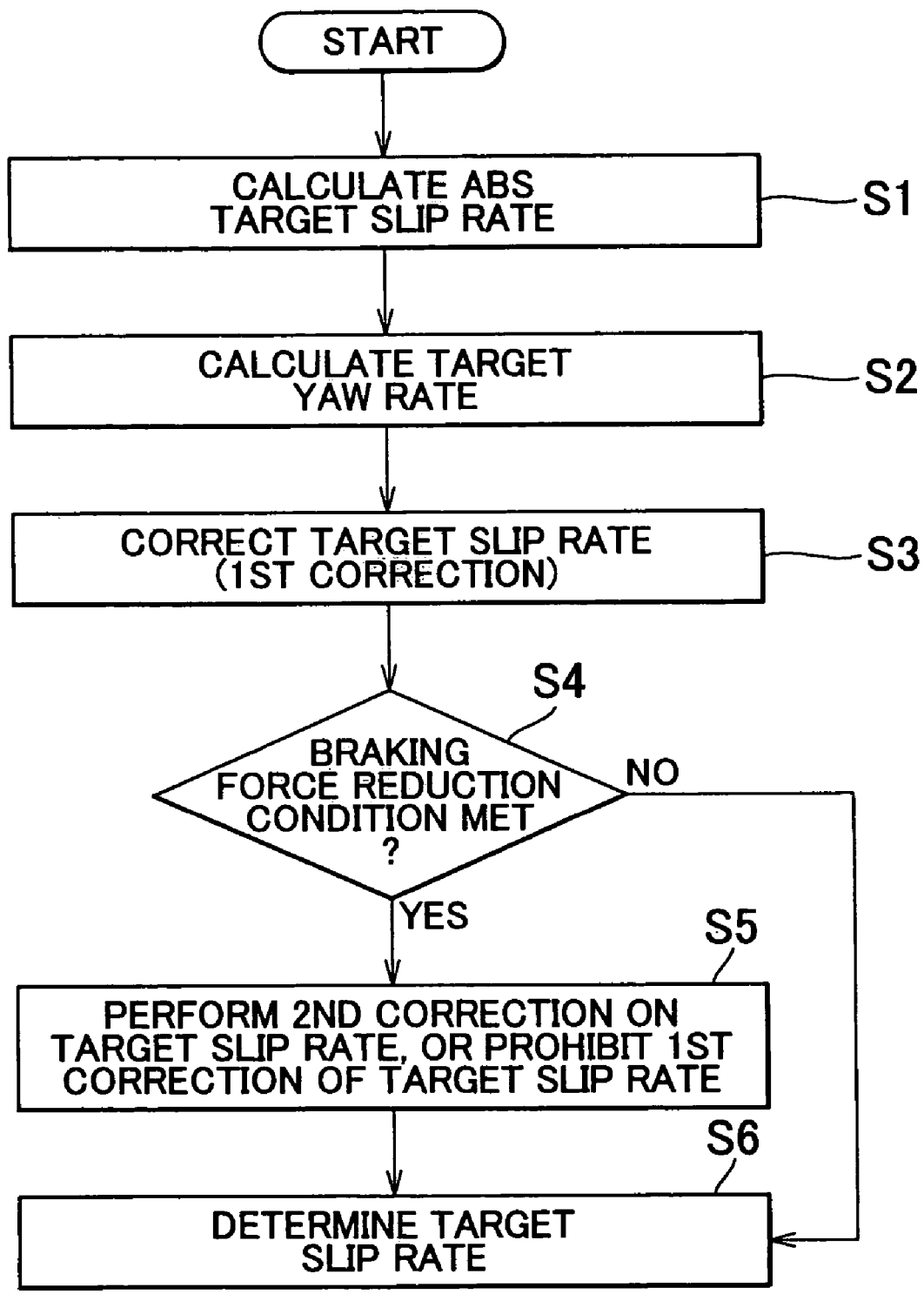
FIG. 6 is a flowchart illustrating a control procedure executed by the ECU 10.

FIG. 6 is a flowchart illustrating a control procedure executed by the ECU 10. It is assumed herein that the ABS control mode has begun. During the ABS control mode, a target slip rate is calculated so that the slip rate is within the μ-peak region (S1). It is also possible to select appropriate data from a map of the target slip rate corresponding to the vehicle speed.

Subsequently, a target yaw rate is calculated (S2). The following method is employed to calculate the target yaw rate. Here, the state of the vehicle is determined to detect understeer or oversteer of the vehicle.

If it is determined that the vehicle is understeering, the target slip rate is corrected so as to reduce the target slip rate $S_{INITIAL}$ and, more particularly, reduce the slip rate of the outer wheel receiving relatively large load while the vehicle is turning, in order to improve the cornering performance of the vehicle (S3). The setting applied in the case of oversteer of the vehicle has already been described above.

After that, it is determined whether it is likely that the braking force would decrease, that is, a determination is made as to braking force reduction condition (S4). In the foregoing description, this determination is made as to the state of road surface. Examples of braking force reduction conditions where reduction in the braking force is concerned are as follows:

(i) when the road surface state is not a good road
(ii) when road surface friction coefficient differs between right and left wheel
(iii) when the is an abnormality in the brake apparatus If the braking force reduction condition is not met (NO at S4), the target slip rate $S_{FINAL}$ is set at the aforementioned target slip rate (S3). That is, the final target slip rate $S_{FINAL}$ is corrected so as to change in accordance with the target yaw rate $Y_{TARGET}$ (target slip rate variation control).

If the braking force reduction condition is met (YES at S4), the target slip rate $S_{FINAL}$ is set at a value that is different from the target slip rate $S_{CORRECTED}$ provided in step S3 and that will increase the longitudinal force (S5).

The longitudinal force can be increased by bringing the slip rate into or close to the μ-peak region. Therefore, in such a case, the final target slip rate is set within the μ-peak region or in a region adjacent to the μ-peak region by further correcting the target slip rate $S_{CORRECTED}$ (second correction) or prohibiting the first correction of the target slip rate initially set within the μ-peak region.

The first correction is performed to reduce the target slip rate. Therefore, if the first correction is prohibited, the final target slip rate $S_{FINAL}$ is greater than the rate provided by the first correction performed in the case of an understeer of the vehicle. Therefore, the target slip rate and the longitudinal force on wheels once reduced for the purpose of securing a lateral force are increased, so that the braking force improves with precedence over the cornering performance.

Also, in the case (i) where the road surface is not in a good state, for example, the road surface state may be distinguished among three states including a poor surface road, a very poor surface road and a gravel road, and the target slip rate is set in accordance with the determined road surface state. Then, if the vehicle is understeering, the amount of increasing correction of the final target slip rate $S_{FINAL}$ is set progressively greater in the order of the poor surface road, the very poor surface road and the gravel road, so that the longitudinal force increases in the same order. Naturally, if the first correction is prohibited, the target slip rate $S_{INITIAL}$, that is, an initial ABS control target value, is adopted, so that a maximum longitudinal force is obtained. More specifically, when the vehicle is running on a poor surface road, it reduces the time of contact between the wheels and the road surface, and therefore, the braking force accordingly decreases in this case. To counter this, the control system of the embodiment executes the aforementioned control where securing the braking force is of high priority.

In the case (ii) where the road surface friction coefficient $\mu$ differs between the right and left wheels, the first correction is prohibited and therefore the target slip rate $S_{INITIAL}$, that is, the initial ABS control target value, is adopted, so that a maximum longitudinal force is obtained. That is, if the vehicle is running on a road where the right and left wheels are subjected to different road surface friction coefficients $\mu$, a control of reducing the braking force on the higher-$\mu$ side wheels will be performed during the ABS mode in order to keep the yaw of the vehicle at a target value; therefore, a reduction in the braking force is expected. Hence, in this case, too, the aforementioned braking force priority control is performed.

It is determined whether the vehicle is running on such a road having a surface where the value of $\mu$ is different between the right and left sides as follows.

During the ABS control mode while the vehicle is running on the right-left varied-$\mu$ road surface condition, one of the right and left wheels is caused to generate a braking force such that the actual yaw rate becomes equal to the target yaw rate. Specifically, if the target yaw rate is 0 degree in direction (rectilinear travel), a rightward swing of a forward portion of the vehicle relative to a rearward portion is countered by changing the slip rate so as to increase the left-side wheel longitudinal force (reduce the right-side wheel longitudinal force), or a leftward swing of the forward portion of the vehicle is countered by changing the slip rate so as to increase the right-side wheel longitudinal force (reduce the left-side wheel longitudinal force).

That is, if not on a right-left varied-$\mu$ road surface, the right and left wheels produce substantially equal braking forces. However, if a wheel on a side produces a greater braking force than a wheel on the other side, that is, if the difference $\Delta$ in the value of time quadrature of the fluid pressure between the right and left wheels ($\Delta$={$\Sigma$pressure increase time (right wheel)–$\Sigma$pressure decrease time (right wheel)}–{$\Sigma$pressure increase time (left wheel)–$\Sigma$pressure decrease time (left wheel)} exceeds a predetermined value, it can be determined that the road surface friction coefficient $\mu$ differs between the right and left wheels since the aforementioned condition or phenomenon occurs during the run on a right-left varied-$\mu$ road surface. It is to be noted herein that the right and left wheels mentioned herein refer to front right and left wheels.

The difference $\Delta$ in the value of time quadrature of the fluid pressure is dependent on the operation of the steering wheel as well. To exclude this factor, the determination regarding the right-left varied-$\mu$ road surface condition is carried out during a stage where the effect of the factor is minimum, that is, at the beginning of the ABS control mode, that is, during the initial cycle of the ABS control.

In the case (iii) where there is an abnormality in the brake apparatus for one of the right and left wheels, the first correction is prohibited and therefore the target slip rate $S_{INITIAL}$, that is, the ABS control target value, is adopted, so that a maximum longitudinal force is provided. In the case of an abnormality in the brake apparatus, for example, in the case of extreme abrasion of a brake pad or the case of breakage of a brake fluid system, it is expected that the braking force will reduce. Therefore, in this case, too, the aforementioned braking force priority control is performed.

It is determined whether there is an abnormality in the brake apparatus in the following manner.

It is assumed herein that the hydraulic system of the brake fluid for the wheels WFL (front left wheel), WFR (front right wheel), WRL (rear left wheel), WRR (rear right wheel) has an X piping arrangement. That is, the front left wheel WFL and the rear right wheel WRR are supplied with the brake fluid from the master cylinder via a pipeline, and the front right wheel WFR and the rear left wheel WRL are supplied with the brake fluid from the master cylinder via another pipeline.

The wheel speeds VWFL, VWFR, VWRL, VWRR output from the wheel speed sensors provided for the wheels WFL, WFR, WRL, WRR satisfy the following condition if there is an abnormality in the brake apparatus (e.g., a piping failure).

(Abnormality Condition)

$|VWFR-VWRR| \geq A \times Vso$ $|VWFL-VWRL| \geq A \times Vso$ $(VWFR-VWRR) \times (VWFL-VWRL) < 0$ If the abnormality condition is met, it is determined that the brake apparatus has an abnormality. A precondition for the determination is that the brake pedal is in a depressed state (the switch STP or the switch F shown in FIG. 1 is on).

It can be said that the aforementioned abnormality condition is a state where there is a speed difference between the inner and outer wheels during a turn but the speed of one of the front wheels has not reduced. In the abnormality condition expressions, A represents a coefficient, and Vso represents an estimated vehicle body speed.

In the flowchart described above, the determination as to whether to allow various controls or computations may be carried out prior to the control or computation concerned.

The estimated vehicle body speed Vso, which is also used as a vehicle speed during the ABS control, can be given by, for example, the following equation. In the equation, MED is a symbol for determining a median value in the subsequent set, and n is an integer that increases with the number of control cycles.

$Vso(n)=MED(VW0, Vso(n-1)+\alpha DW \cdot T, Vso(n-1)+\alpha UP \cdot T)$ where
Vso: estimated vehicle body speed
VW0: selected wheel speed αDW: upper limit value of Vso deceleration
αUP: upper limit value of Vso acceleration
T: Vso calculation period For increased reliability, the ABS generally does not employ a sensor for directly detecting the vehicle body speed, but uses inputs from the wheel speed sensors provided for the four wheels. Therefore, the vehicle body speed needed for calculating the slip rate S is determined as an estimated vehicle body speed obtained by selecting the maximum value of the speeds of the four wheels and providing upper and lower limit guards for the selected value. Apparently, a sensor for directly detecting the vehicle body speed may be installed in order to determine the vehicle body speed. As described above, during the ABS control mode of the brake system, the slip rate of the loaded-side front wheel is normally reduced so as to increase the lateral force on the wheel and therefore improve the cornering performance of the vehicle (first correction). However, during a poor surface road run, the slip rate is increased to increase the longitudinal force (second correction) or the slip rate reducing correction is avoided, in order to increase the braking force. It is to be noted herein that the foregoing description is based on the assumption that the vehicle is in an understeer state. Furthermore, during the ABS control mode, the yaw rate control is performed as well as the aforementioned correction operation (first correction) of reducing the slip rate of the loaded-side front wheel so as to increase the lateral force and therefore improve the cornering performance. Therefore, if the vehicle is running on a right-left varied-μ road surface, the hydraulic pressure on the higher-μ side is reduced, so that the brake effect becomes less and the slip rate reduces (the longitudinal force becomes small). Thus, the vehicle does not readily stop. Therefore, in that case, the slip rate is increased (the longitudinal force is increased (second correction)) in order to stop the vehicle.

Thus, according to the above-described brake system of the invention, it becomes possible to curb the reduction in the braking force during the ABS control.

What is claimed is:

1. A brake system for a vehicle, comprising:
    a brake apparatus that applies braking force to each wheel of the vehicle; and
    a controller that controls the braking force applied to the wheel by controlling the brake apparatus so that an actual slip rate of the wheel matches a target slip rate, wherein the controller is adapted to:
    during a specific brake control mode in which the target slip rate is set so as to prevent the actual slip rate of the wheel from exceeding a reference value and therefore avoid locking the wheel, make a first correction to the target slip rate set in the brake control mode such that the actual yaw rate of the vehicle matches a target yaw rate; and
    ensure through an adjustment of the target slip rate, a provision of a greater longitudinal force on the wheel than that obtained with the target slip rate determined or would have been determined by the first correction if a reduction in braking force of the vehicle is expected, wherein the controller is further adapted to bring about the adjustment of the target slip rate by increasing the target slip rate determined by the first correction or by prohibiting the first correction, and the controller is further adapted to control a value of time quadrature of a fluid pressure that is applied to the brake apparatus in proportion to a deviation of the actual slip rate from the target slip rate.

2. The brake system according to claim 1, wherein the controller is further adapted to make the first correction when the vehicle is turning so that a cornering performance of the vehicle improves.

3. The brake system according to claim 2, wherein the controller is further adapted to make the first correction such that the target slip rate of one of the wheels that is located on an outer side while the vehicle is turning is reduced relative to the target slip rate of another wheel that is located on the other side so as to improve a cornering performance of the vehicle when the actual yaw rate is less than the target yaw rate.

4. The brake system according to claim 1, wherein the controller is further adapted to expect the reduction in the braking force of the vehicle when the vehicle is running on a poor surface road.

5. The brake system according to claim 1, wherein the wheels are a right wheel and a left wheel of the vehicle and the controller is further adapted to expect the reduction in the braking force of the vehicle when road surfaces that contact the right wheel and the left wheel of the vehicle have friction coefficients that are different from each other.

6. The brake system according to claim 1, wherein the controller is further adapted to expect the reduction in the braking force of the vehicle when there is an abnormality in the brake apparatus for any one of the wheels.

7. The brake system according to claim 1, wherein the wheels are a right wheel and a left wheel of the vehicle and the controller is further adapted to:
    determine a running speed of the vehicle;
    determine an angle of a steering of the vehicle;
    calculate the target yaw rate in accordance with the determined running speed of the vehicle and the determined angle of the steering; and
    make the first correction by correcting the target slip rate of the right wheel and the target slip rate of the left wheel so that the calculated target yaw rate and the actual yaw rate become equal.

8. A method of controlling a brake apparatus for applying braking force to wheels of a vehicle, the method comprising:
    controlling the braking force applied from the brake apparatus to each wheel when an actual slip rate of the wheel has exceeded a reference value so that the actual slip rate matches a target slip rate and the wheel is thereby prevented from being locked;
    making a first correction to the target slip rate so that an actual yaw rate of the vehicle matches a target yaw rate; and
    ensuring through an adjustment of the target slip rate, a provision of a greater longitudinal force on the wheel than obtained with the target slip rate determined or would have been determined by the first correction if a reduction in braking force of the vehicle is expected, wherein the adjustment of the target slip rate is brought about by increasing the target slip rate determined by the first correction or by prohibiting the first correction, and a value of time quadrature of a fluid pressure that is applied to the brake apparatus is controlled in proportion to a deviation of the actual slip rate from the target slip rate.

9. The method according to claim 8, wherein the first correction is made when the vehicle is turning so that a cornering performance of the vehicle improves.

10. The method according to claim 9, wherein the first correction is made such that a target slip rate of one of the wheels that is located on an outer side of the vehicle while the vehicle is turning is reduced relative to a target slip rate of another wheel if the actual yaw rate of the vehicle is below the target yaw rate.

11. The method according to claim 8, wherein the reduction in the braking force of the vehicle is expected when the vehicle is running on a poor surface road.

12. The method according to claim 8, wherein the wheels are a right wheel and a left wheel of the vehicle and the reduction in the braking force of the vehicle is expected when road surfaces that contact the right wheel and the left wheel of the vehicle have friction coefficients that are different from each other.

13. The method according to claim 8, wherein the reduction in the braking force of the vehicle is expected when there is an abnormality in the brake apparatus for any one of the wheels.

14. The method according to claim 8, wherein the target yaw rate is calculated in accordance with a running speed of the vehicle and an angle of a steering of the vehicle.

* * * * *